UNITED STATES PATENT OFFICE.

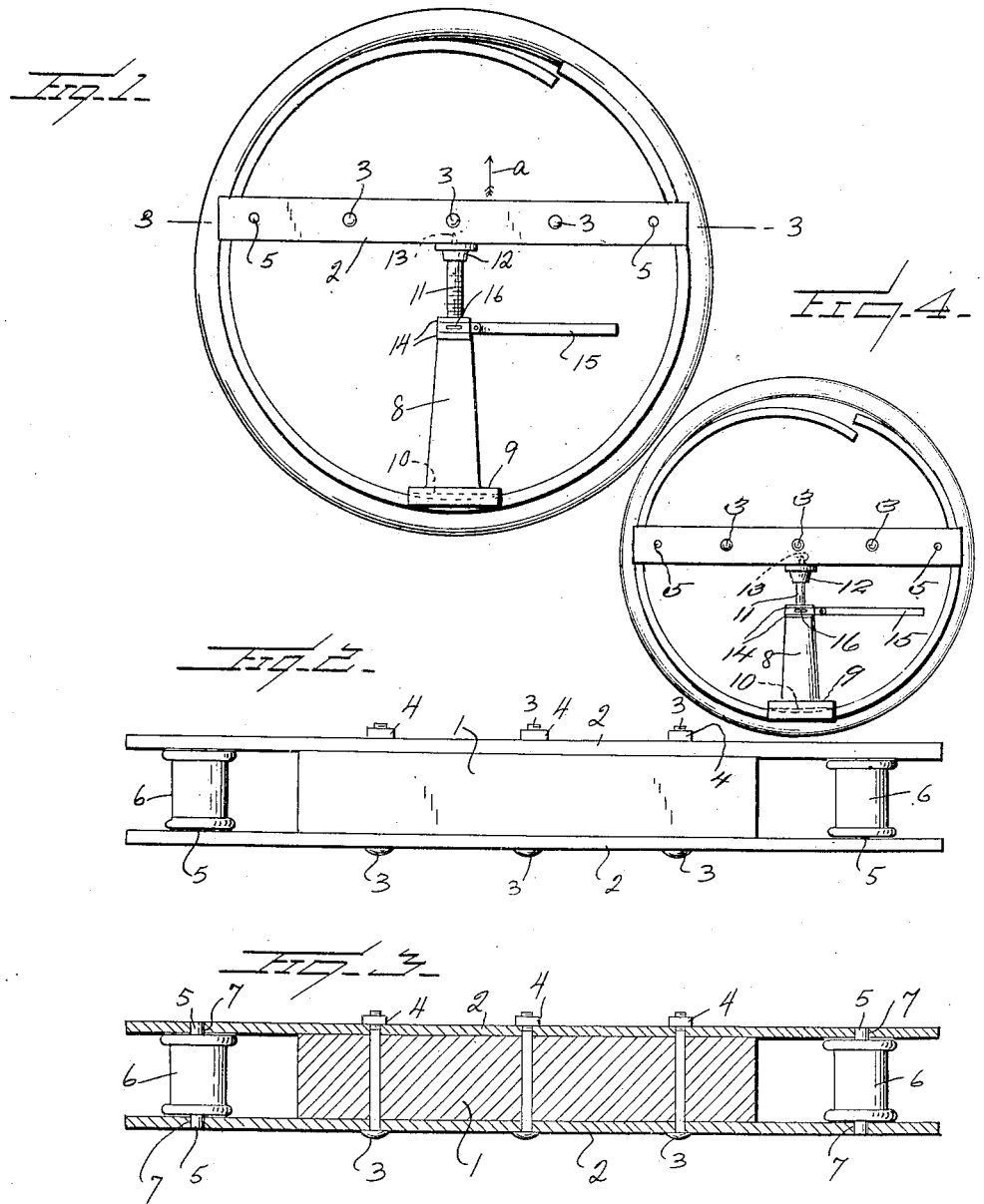

ORA K. SAUDER, OF GRABILL, INDIANA.

WHEEL OR RIM SPREADER.

1,350,524.  Specification of Letters Patent. Patented Aug. 24, 1920.

Application filed August 11, 1919. Serial No. 316,761.

*To all whom it may concern:*

Be it known that I, ORA K. SAUDER, a citizen of the United States, residing at Grabill, in the county of Allen and State of Indiana, have invented certain new and useful Improvements in Wheel or Rim Spreaders, of which the following is a specification, reference being had to the accompanying drawings.

This invention relates to a wheel or rim spreader, and an object of the invention is to provide a simple, efficient and practical device of this kind which may be manufactured for a relatively low cost and sold at a reasonable profit.

A further object of the invention is to provide a spreader having means to engage substantially diametrically opposite points of the wheel or rim, in combination with a device such as a jack, to engage between said means and a portion of the rim, to cause the opposite ends of said means to coact with the wheel or rim, for spreading the parts of the wheel or rim.

A further object of the invention is to provide a device of this kind comprising improved features of construction. One of the features of construction is the provision of a central body member having oppositely secured plates thereon, between the opposite ends of which rollers or other antifrictional means are journaled, to engage the substantially diametrically opposite parts of the wheel or rim, to spread the same, when a jack operates between the body and a portion of the rim.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in elevation of a portion of a rim showing the improved device applied and constructed in accordance with the invention.

Fig. 2 is a plan view of the spreader.

Fig. 3 is a horizontal sectional view on line 3—3 of Fig. 1.

Fig. 4 is a view in elevation showing the improved rim spreader as applied, showing the position before the rim is expanded to the extent that is illustrated in Fig. 1.

Referring more especially to the drawings, 1 designates a body member, to the opposite faces of which plates 2 are secured, by means of bolts 3 which pass through the body member and through the plates and are provided with nuts 4. This body member may be constructed of any suitable material, preferably wood or the like, though not necessarily, for the body member may be constructed of metal. The opposite ends of the plates project beyond the body member and are spaced, and are provided with bearings 7 at their ends. Journaled in the bearings are the pintles 5 of the antifrictional rollers 6. These rollers have flanges at their ends to overlie the opposite sides of the rim to prevent movement of the rollers laterally to the rim, and yet allowing the rollers to roll upon the rim, as the spreader is operated, in fact, as the spreader is moved toward the free ends of the rim. An operating jack 8 is provided. This jack comprises a base 9, which has its under portion grooved as shown at 10, to engage and receive the rim. Threaded in the base is a screw 11, and swiveled on the end of the screw is a head member 12 having a sharpened lug 13, which bears against the body member 1 of the spreader. The central portion of the screw is provided with spaced integral collars 14, between which ratchet teeth are formed. An operating handle 15 is swiveled on the screw between the integral collars, and is provided with pawls 16 to coöperate with the ratchet teeth, so as to impart an intermittent movement to the screw, so that when moving the operating handle in one direction, the screw will operate against the spreader, forcing the same in the direction of the arrow *a*, in which case the rollers 6 will coöperate with the rim and cause the ends of the rim to spread apart.

The invention having been set forth, what is claimed as new and useful is:

1. In a spreader of the kind set forth, the combination with a body having projecting spaced ends extending beyond the end of the body, of anti-frictional rollers journaled in said spaced ends adapted to engage substantially diametrically opposite portions of the rim, and means coöperating between the body and a portion of the rim at right angles to the point where the anti-frictional members engage the rim, to operate the spreader to cause the ends of the rim to spread apart, said means comprising a base member having a groove to engage and receive the rim, a screw threaded in the base member and having a swiveled head coacting against the body member of the spreader and means for imparting an intermittent motion to the screw.

2. In a device as set forth, a body member, elongated plates bolted to the opposite sides of the body member, said plates projecting beyond the ends of the body member thereby providing forks adapted to straddle the rim when the body member is disposed substantially across the diameter of the rim, flanged rollers journaled in bearings of said forks and engaging the inner periphery of the rim, and adapted to be adjusted from the center of the rim, while in a horizontal plane for spreading the ends of the rim.

3. As an article of manufacture, a tool for spreading the ends of a rim, comprising a body, elongated plates bolted to the opposite sides of the body, said plates having extensions protruding beyond the ends of the body and constituting arms adapted to straddle the rim when the tool is disposed substantially across the diameter of the rim, rollers journaled in said arms and engaging the inner periphery of the rim, whereby upon adjusting the tool from the center of the rim while in a horizontal plane, the rollers will act to spread the ends of the rim.

In testimony whereof I hereunto affix my signature in the presence of two witnesses.

ORA K. SAUDER.

Witnesses:
HOMER J. KLOPFENSTEIN,
RACHEL ROTH.